June 6, 1933.    A. G. GIBSON    1,912,631
INSULATING UNIT FOR COLD STORAGE AND REFRIGERATOR INSULATION
Filed Aug. 9, 1930
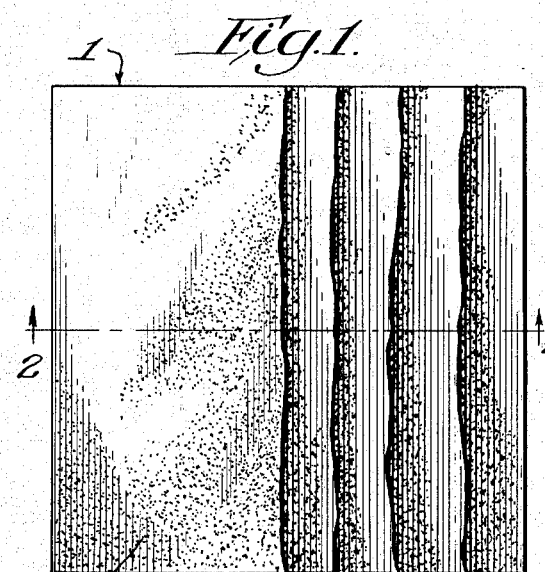
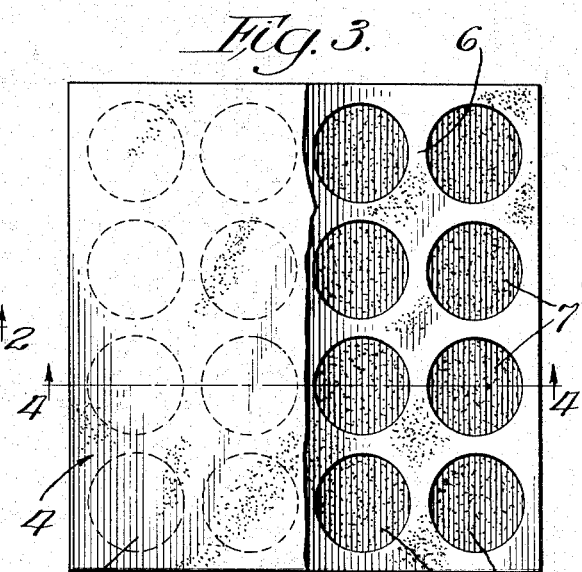
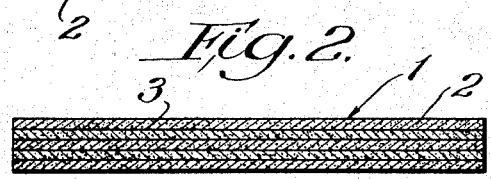
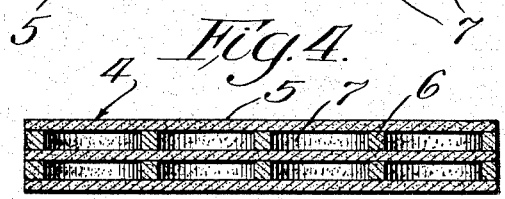
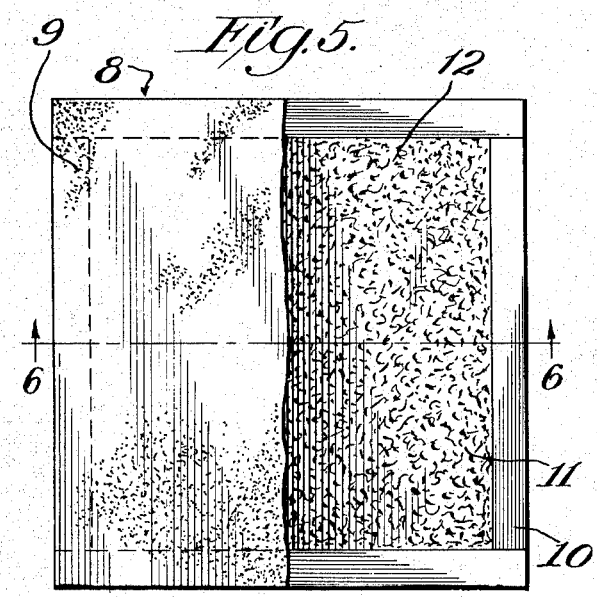
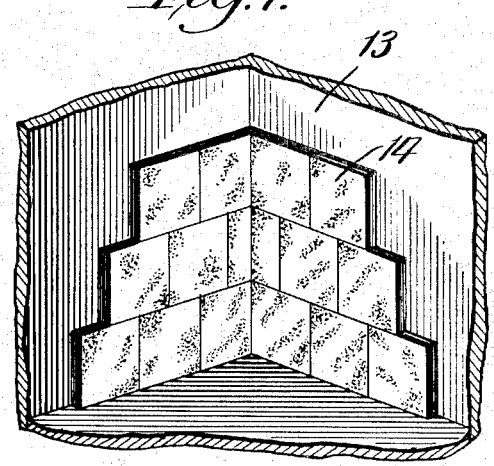
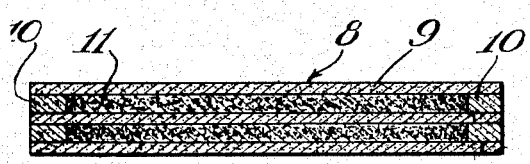
Inventor
Albert G. Gibson,
by Frank L. Belknap
Atty Patented June 6, 1933

1,912,631

UNITED STATES PATENT OFFICE

ALBERT G. GIBSON, OF ST. JOSEPH, MISSOURI

INSULATING UNIT FOR COLD STORAGE AND REFRIGERATOR INSULATION

Application filed August 9, 1930. Serial No. 474,236.

This invention relates to improvements in insulating units, and refers specifically to the provision, in refrigerator, cold storage insulation or the like, of a substitute for insulating units of the type wherein a binder and discontinuous pieces of material of low heat conductivity are used, and comprises a multiply structure consisting of plies of material having inherent insulating properties, adherently united by a film of adhesive interposed between the plies.

In large refrigerator and cold storage installations, heat insulation is usually obtained by lining the walls of the plant with insulating units comprising a more or less homogeneous mass of discontinuous pieces of material of low heat conductivity, usually cork, and a binder. An inherent disadvantageous feature present in such installations is the lack of flexibility in the replacement of such units. For instance, were a portion of the surface of the insulating walls torn or gouged, which frequently happens, particularly in packer's refrigerators where hooks are used to handle the meat, to restore the insulating efficiency of that portion of the wall would necessitate the removal and replacement of the entire unit so damaged.

The adhesive material at 3, Fig. 2, if waterproof, prevents the permeation of moisture beyond the outer layer of board and the insulating value is only slightly reduced as compared to a condition where the insulating value of the entire block is reduced; where extreme temperatures are not maintained, it may not be necessary to even replace the outer layer.

To obviate this waste, I provide unit insulating blocks of laminated insulated material, comprising alternate laminæ of imperforate sheets of material having inherent insulating properties, and if desired, perforated or imperforate sheets of similar material. If the latter type is used, the voids in said alternate sheets are, as desired, either maintained as dead air cells or filled with loosely associated particles of material having properties of low heat conductivity, said alternate plies being maintained in the form of a laminated block by adhesively uniting, preferably by a waterproof adhesive, adjacent plies.

If, for example, one of the surfaces of my insulating block is torn, gouged or saturated with moisture, there is no necessity of removing the entire block since only that laminæ which is mutilated may be removed and a new laminæ be applied to the remaining block as a replacement.

Other and further advantages and features of my invention will be apparent from the accompanying drawing and the following detail description.

In the drawing:

Fig. 1 is a top plan view, parts being broken away, of an insulating block constructed in accordance with my invention;

Fig. 2 is a sectional view taken on the line 2—2 of Fig. 1;

Fig. 3 is a top plan view, parts being broken away, of a slight modification of my invention;

Fig. 4 is a sectional view taken on the line 4—4 of Fig. 3;

Fig. 5 is a top plan view of a further modification of my invention;

Fig. 6 is a sectional view taken on the line 6—6 of Fig. 5; and

Fig. 7 is a fragmentary perspective of a portion of a refrigerating compartment lined with my insulating units.

Referring more in detail to the drawing, 1 indicates a unit insulating block which may comprise a plurality of sheets of material 2 possessing inherent qualities of insulation to sound and heat. The sheets 2 may be adhesively united as shown best at 3 (Fig. 2) by an adhesive material such as asphalt or any other adhesive possessing waterproofing qualities. The block 1 may comprise one of a plurality of units which may be built up to form an insulating lining for a wall of a refrigerator, cold storage room, or any other compartment which it may be found desirable to insulate from sound or heat.

The sheets 2 may be constructed of a material such as vegetable fiber, straw waste, felt, or any like material which, when formed, preferably by felting, into sheets, possesses intrinsic qualities of insulation. In addition to having such above mentioned qualities, the material, when formed into sheets, must possess an element of rigidity. The sheets may be square in form, oblong, or of any suitable geometrical shape.

It is to be understood, of course, that the block 1 may comprise any number of unit sheets 2, and said sheets may be of any desired thickness, or the various sheets comprising the block may be of different thicknesses.

Referring particularly to Fig. 3, 4 indicates a block possessing qualities of insulation, and may comprise alternate sheets of imperforate insulating plies 5 and adjacent perforated plies 6. The plies 6 may be faced on each side by an imperforate sheet 5 and may form dead air cells 7, which increase the insulating properties of the block in proportion to its weight and thickness.

It is to be understood that any number of alternate plies 5 and 6 may be utilized in building up block 4, and that the alternate plies 5 and 6 may be of any desired thickness. The material of which said sheets 5 and 6 are constructed may be the same or, if desired, said sheets may be constructed of different materials, but at all events both sheets are preferably constructed of a material or materials which combine the quality of insulation with rigidity. The sheets 5 and 6 are preferably joined by a waterproof adhesive such as asphalt or the like.

Referring particularly to Figs. 5 and 6, a further modification of my invention is shown, wherein 8 indicates a block of insulation which may comprise alternate plies of imperforate material 9 and perforated plies 10. The space 11 thus formed in the sheet 10 between adjacent imperforate plies 9 may be filled with a material 12, such as loosely packed straw waste, or other loosely packed vegetable fibre. The sheets 9 and 10 may be joined by an adhesive material such as asphalt or the like.

It is to be understood, of course, that the space 11 provided in the sheet 10 may be of any particular size and shape, and any number of said spaces may be provided between alternate sheets 9. It is also to be understood that instead of filling the space of spaces 11, the same may be maintained as dead air cells.

A refrigerator or cold storage wall 13 may be lined with a plurality of blocks 14 which may take the form of blocks 1, 4 or 8, and, as can readily be seen from the construction of said blocks, when the exterior ply or plies of the same are mutilated, said ply or plies may be removed from the block proper and a new ply or plies may be mounted upon said block. It is apparent that by this provision, the necessity for removing an entire block, when the outer surface thereof has been gouged or mutilated, is eliminated, and hence the maintenance cost of efficient insulation in refrigerators and cold storage compartments is reduced.

In the lining of refrigerator walls 13, instead of using one layer of blocks 14, a plurality of layers (not shown) of said blocks may be utilized. In this manner, any desired degree of insulation may be provided.

I am aware that many modifications of my invention may be devised without departing from the spirit thereof, and hence I do not wish to be limited except as necessitated by the prior art.

I claim as my invention:

An insulating unit for use in refrigerator and cold storage insulation, comprising a multi-ply structure consisting of alternate plies of perforated and imperforate material having intrinsic properties of insulation adherently united by a film of adhesive interposed between the plies providing dead air cells within the unit, said perforations being filled with loosely associated shredded insulating material.

In testimony whereof I affix my signature.

ALBERT G. GIBSON.